United States Patent [19]
Caramanian, deceased et al.

[11] 3,939,020
[45] Feb. 17, 1976

[54] METHOD OF BALANCING A ROTOR

[75] Inventors: Ara Caramanian, deceased, late of Cincinnati, Ohio, by Adele Jeannette Caramanian, executrix, Cincinnati, Ohio; John A. Caramanian, Colerain Township, Hamilton County, Ohio

[73] Assignee: John A. Caramanian, Colerain Township, Hamilton County, Ohio

[22] Filed: Feb. 11, 1974

[21] Appl. No.: 441,208

Related U.S. Application Data

[62] Division of Ser. No. 859,049, Sept. 18, 1969, abandoned.

[52] U.S. Cl.............. 156/64; 74/573 R; 156/330; 260/37 EP; 301/5 B
[51] Int. Cl.²........................................ G01M 1/00
[58] Field of Search .... 156/64, 330; 301/5 B, 5 BA; 74/573, 574; 29/598; 260/37 EP; 264/40; 117/19, 161 ZB; 427/386

[56] References Cited
UNITED STATES PATENTS

| | | | |
|---|---|---|---|
| 1,209,730 | 12/1916 | Leblanc | 301/5 BA |
| 1,761,023 | 6/1930 | Pontis | 301/5 B |
| 3,247,004 | 4/1966 | Dosser | 117/19 |
| 3,291,630 | 12/1966 | Derle et al. | 117/19 |
| 3,312,847 | 4/1967 | Waclaw | 29/598 |
| 3,349,478 | 10/1967 | De Jean | 29/598 |

*Primary Examiner*—Edward G. Whitby
*Attorney, Agent, or Firm*—James W. Pearce; Roy F. Schaeperklaus

[57] ABSTRACT

A method of balancing a rotor. An epoxy resin balancing composition is applied to the rotor and the rotor is dynamically tested before the resin is cured. The resin composition includes fibrous inorganic material, which renders it cohesive, weighting material including powdered zinc and barium sulphate and a reactive polyamide, catalyst, and a diluent. The composition has a specific gravity of at least 2.0 and has substantially no slump at room temperature. The composition is sufficiently tacky, adherent, and cohesive to adhere to the rotor during dynamic testing before curing.

6 Claims, 2 Drawing Figures

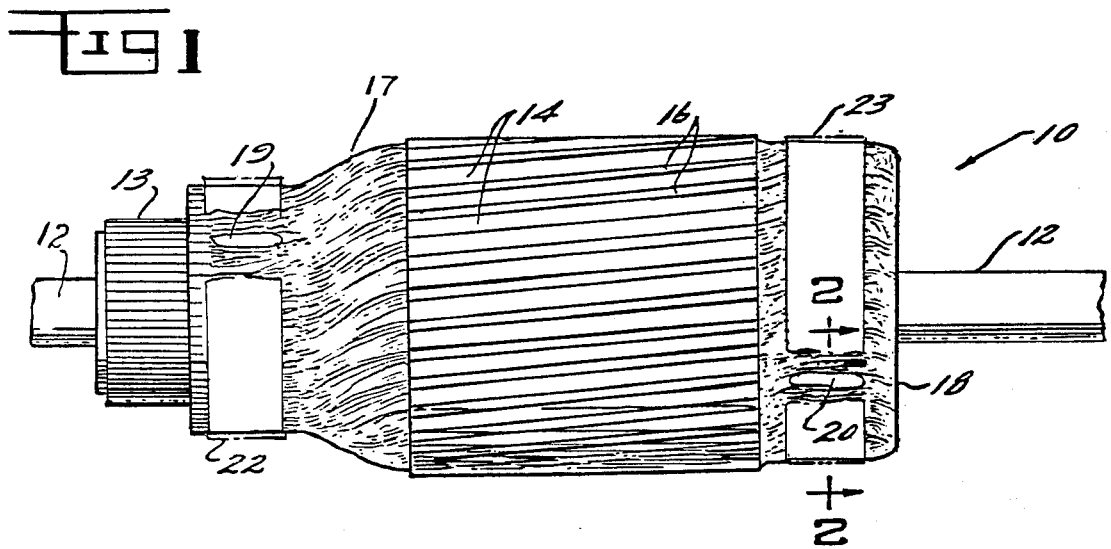
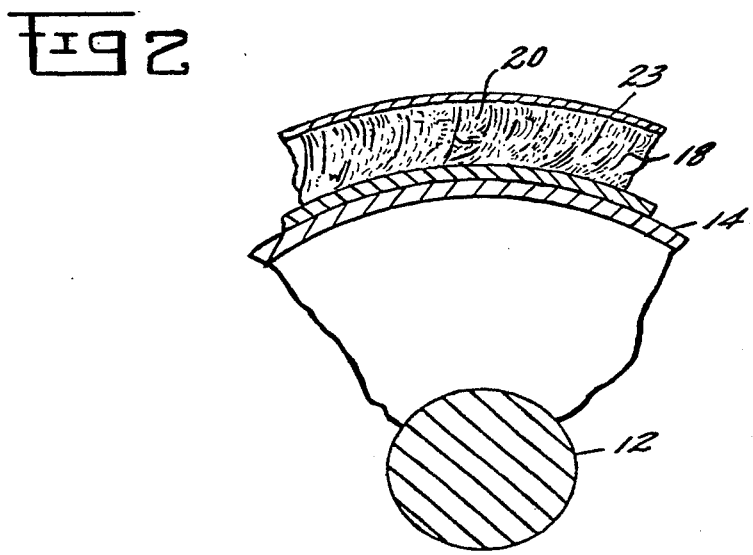

METHOD OF BALANCING A ROTOR

This is a division of our co-pending application Ser. No. 859,049, filed Sept. 18, 1969 now abandoned.

This invention relates to a composition for balancing a rotor.

An object of this invention is to provide a plastic resinous rotor balancing composition which is putty-like in consistency and can be mounted on a rotor and adheres thereto.

A further object of this invention is to provide a weighted, adherent, and cohesive plastic resin composition which adheres to a rotor and does not separate from the rotor during dynamic balancing thereof.

A further object of this invention is to provide such a composition which can be used to balance an armature of a motor and which is electrically non-conductive so that it does not interefere with coils and the like of the armature.

A further object of this invention is to provide such a composition which does not shrink substantially or lose weight during curing.

Briefly, the rotor balancing composition has an epoxy resin base which can adhere to a rotor part and includes fibrous inorganic material such as asbestos and calcium silicate and high specific gravity material such as powdered zinc and barium sulphate. The fibrous material renders the resin cohesive while the high specific gravity material makes the composition of sufficiently high specific gravity to be effective for balancing without using an excessive volume of material. Preferably sufficient of the high specific gravity material is used to give a composition having a specific gravity of at least 2.0. Sufficient of the fibrous material is used to render the composition cohesive even before it sets so that, after a piece of the balancing composition has been affixed to the rotor, the rotor can be rotated for testing the dynamic balance before the resin sets and, after such testing of the dynamic balance, the piece can be made larger or smaller if necessary to correct any inaccuracy in initial balancing.

In balancing a rotor, the rotor can be rotated on appropriate dynamic balancing equipment to determine the amount of the balancing composition required and the position at which it should be attached. A sufficiently large lump of the balancing compound is stuck to the rotor and adheres thereto. The rotor is then dynamically tested again to determine if the balancing is correct and, if not, a portion of the lump can be pinched off or additional balancing composition can be added to the lump.

In the following detailed description and the example, all parts and percentages are given by weight.

My preferred balancing composition is made from two components, one of which contains the epoxy resin and the other of which contains a catalyst for causing setting of the resin. In the preferred formulation, the components are adapted to be mixed together in equal amounts. An example of our composition includes:

Component A

| | |
|---|---|
| Epoxy resin (Shell Epon 828) | 46.32 parts |
| Fibrous crystalline calcium silicate (Cab-o-lite) | 7.33 parts |
| Powdered zinc | 16.35 parts |
| Asbestos fibres | 8.17 parts |
| Powdered barium sulphate | 21.83 parts |
| | 100.00 parts |

Component B

| | |
|---|---|
| Polyamide (Shell V 15) | 29.7 parts |
| Fibrous crystalline calcium silicate (Cab-o-lite) | 18.6 parts |
| Powdered barium sulphate | 37.2 parts |
| Tridimethyl amino methyl phenol | 1.5 parts |
| Asbestos fibres | 9.3 parts |
| High boiling aromatic diluent (Mobilsol 66) | 3.7 parts |
| | 100.00 parts |

The resin of Component A can be the commercial product known as Shell Epon 828, a trademark of Shell Oil Company, and has an epoxy base of bisphenol A-epichlorhydrin type having an epoxy equivalent of 185 to 225 and an average molecular weight of 300 to 400. The crystalline calcium silicate can be a naturally occurring fibrous crystalline calcium silicate known as Cab-o-lite, a trademark of Interpace Corporation and also known as Wollastonite. The polyamide acts as a hardener and can be a reactive polymide resin having an amino equivalent of 200 to 300 known as Shell V 15, a trademark of Shell Oil Company. The polyamide also helps make the balancing compound tacky or adherent. The high boiling aromatic diluent can be the product known as Mobilsol 66, a trademark of Mobil Oil Company, and acts as a plasticizer and for improving electrical properties of the composition. The amount of diluent can be varied to determine the characteristics of the balancing composition. However, the amount of diluent is preferably not sufficient to cause slumping of the balancing compound at room temperature and not sufficient to cause any substantial loss of weight or shrinking of the resin during curing.

Components A and B can be prepared and stored until ready for use. When ready for use, equal weights of components A and B are mixed together to form a smooth putty-like mass of balancing composition. The mass consists of

| | |
|---|---|
| 46.32 parts epoxy resin (Shell Epon 828) | |
| 25.93 parts fibrous crystalline calcium silicate (Cab-o-lite) | |
| 16.35 parts powdered zinc | |
| 17.47 parts asbestos fibres | |
| 59.03 parts powdered barium sulphate | |
| 29.7 parts polyamide (Shell V 15) | |
| 1.5 parts tridimethyl amino methyl phenol | |
| 3.7 parts high boiling aromatic diluent (Mobilsol 66) | |
| 200 parts | |

The balancing compound is sufficiently tacky to stick tightly to rotor parts but not too tacky for ready handling. Pieces or lumps of the balancing compound can be attached to appropriate parts of the rotor for balancing same and adhere strongly thereto so that, after the pieces have been attached, the rotor can be rotated for further testing to determine if the balancing has been done properly. The fibrous crystalline calcium silicate and the asbestos fibres give the balancing composition wet strength or reinforcement so that it does not separate from itself during rotation. If necessary, a small portion of a piece can be pinched off and removed or an additional small piece can be stuck to the piece already in place to correct any error in initial balancing. The resin can be allowed to cure either by standing or the cure can be expedited by heating the rotor.

The above and other features of the invention will be apparent from the following detailed description and the drawing, in which:

FIG. 1 is a view in side elevation of an armature of a motor provided with pieces of balancing composition in accordance with this invention, outer wrappings being shown in dot-dash lines for clarity; and FIG. 2 is a fragmentary view in section taken on an enlarged scale on the line 2—2 in FIG. 1, the outer wrapping being shown in full lines.

In the following detailed description and the drawing, like reference characters indicate like parts.

In FIG. 1 is shown an armature or rotor 10 for an electric motor which includes a shaft 12 on which a commutator assembly 13 and a core 14 are mounted. Armature coils 16 are mounted in slots in the core. End portions 17 of the coils extend from one end of the core to the commutator assembly. End loop portions 18 of the coils extend from the opposite end of the core. The armature is mounted in appropriate dynamic balancing equipment (not shown) and is tested to determine the mass and positioning of balancing weights required. Lumps 19 and 20 of balancing composition can be attached to the end portions of the coils as required to balance the armature.

The lumps can be placed between portions of the coils and adhere to the coils. The armature is again rotated in the balancing equipment to determine if adjustments are required. The adhesion, cohesiveness and wet strength of the lumps prevents their being separated from the rotor during rotation incident to balancing. The balancing composition described in the example adheres to the coils sufficiently strongly and is sufficiently cohesive that prior to curing it stays in position on a rotating armature coil having a peripheral speed of 42 feet per second, as obtained by rotating an armature having a 7 inch diameter at as much as 1,400 r.p.m. Excess balancing composition can be pinched off the lumps or additional balancing composition can be added as required. When balancing is completed, the armature is removed and the end portions 17 and 18 are wrapped with strips of pressure sensitive glass fibre tape 22 and 23 which lock the coils in position and overlie the lumps of balancing composition. Then, the armature can be dipped in varnish in the usual manner and can be heated to a temperature of 200°F. for 20 minutes to cure the resin and dry the varnish.

After setting, the cured balancing composition holds tightly to the coils of the armature. The composition does not shrink or lose weight substantially. Sufficient zinc is present to help build up the weight of the composition and to inhibit corrosion of underlying surfaces without rendering the composition electrically conductive.

Excellent results are obtained where the balancing composition includes approximately 23 per cent epoxy resin, 13 per cent fibrous crystalline calcium silicate, 8 per cent powdered zinc, 9 per cent asbestos fibres, 29 per cent powdered barium sulphate, and 15 per cent polyamide, the remainder being amine catalyst and diluent.

Having described our invention, what we claim as new and desire to secure by Letters Patent is:

1. A method of balancing a rotor which comprises applying to the rotor a balancing composition which consists essentially of approximately 23 percent by weight of an epichlorhydrin-bisphenol A epoxy resin, 22 percent of a fibrous inorganic material, 37 percent of powdered weighting material selected from the group consisting of a powdered zinc and powdered barium sulphate, 15 percent of a reactive polyamide having an amino equivalent of 200 to 300, a catalyst and a diluent, the composition having a specific gravity of at least 2.0 and having substantially no slump at room temperature, the composition being sufficiently tacky, adherent, and cohesive to adhere to the rotor during dynamic testing before curing, dynamically testing the rotor with the balancing composition in position thereon, adjusting the amount of the balancing composition on the rotor to achieve balance, and then curing the resin.

2. A method of balancing a rotor which comprises applying to the rotor a balancing composition which consists essentially of approximately 23 percent by weight of an epichlorhydrin-bisphenol A epoxy resin, 22 percent of a fibrous inorganic material, 37 percent of powdered weighting material selected from the group consisting of a powdered zinc and powdered barium sulphate, 15 percent of a reactive polyamide having an amino equivalent of 200 to 300, a catalyst and a diluent, the composition having a specific gravity of at least 2.0 and having substantially no slump at room temperature, the composition being sufficiently tacky, adherent, and cohesive to adhere to the rotor and remain dimensionally stable during dynamic testing before curing, dynamically testing the rotor with the balancing composition dimensionally stable in position thereon, adjusting the amount of the balancing composition on the rotor to achieve balance, and then curing the resin.

3. A method of balancing a rotor in accordance with claim 2 wherein the amount and position of the balancing composition is adjusted and dynamic testing of the rotor repeated until the desired degree of balance is attained before the resin is cured.

4. A method of balancing a rotor which comprises applying to the rotor an epoxy resin balancing composition having a specific gravity of at least 2.0 and having substantially no slump at room temperature, the composition being sufficiently tacky, adherent, and cohesive, to adhere to the rotor and remain dimensionally stable during dynamic testing before curing, dynamically testing the rotor with the balancing composition dimensionally stable in position thereon, and curing the resin.

5. A method of balancing a rotor which comprises applying to the rotor an epoxy resin balancing composition having a specific gravity of at least 2.0 and having substantially no slump at room temperature, the composition being sufficiently tacky, adherent, and cohesive to adhere to the rotor and remain dimensionally stable during dynamic testing before curing, dynamically testing the rotor with the balancing composition dimensionally stable in position thereon, adjusting the amount and position of balancing composition and dynamically retesting the rotor until the desired degree of balance is attained, and curing the resin.

6. A method of balancing a rotor in accordance with claim 5 wherein the balancing composition consists essentially of approximately 23 percent by weight of an epichlorhydrin-bisphenol A epoxy resin, 22 percent of a fibrous inorganic material, 37 percent of powdered weighting material selected from the group consisting of a powdered zinc and powdered barium sulphate, 15 percent of a reactive polyamide having an amino equivalent of 200 to 300, a catalyst and a diluent.

* * * * *